Dec. 29, 1931.  A. POSPISHIL  1,838,498
CORN HARVESTING MACHINE
Filed Dec. 26, 1930   2 Sheets-Sheet 2
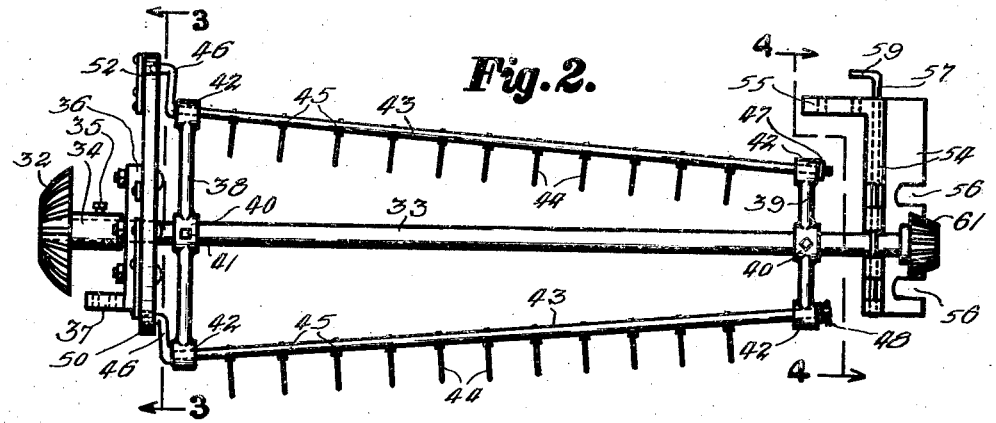
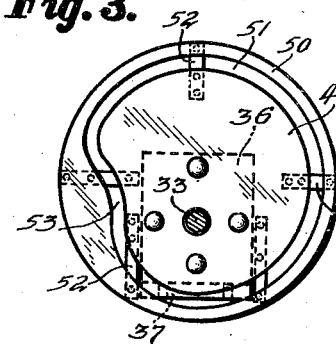
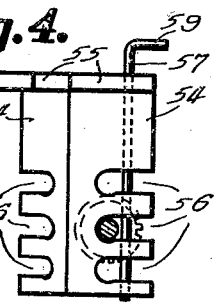
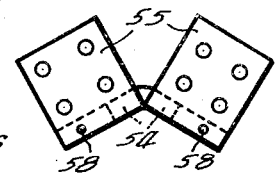
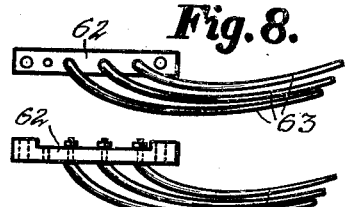
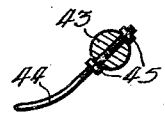
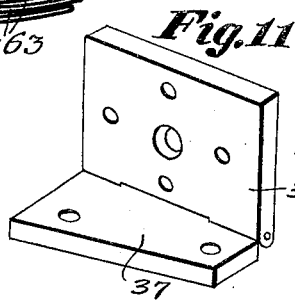
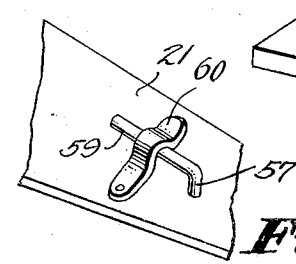
Inventor
August Pospishil
By *Arthur H. Sturges*
Attorney Patented Dec. 29, 1931

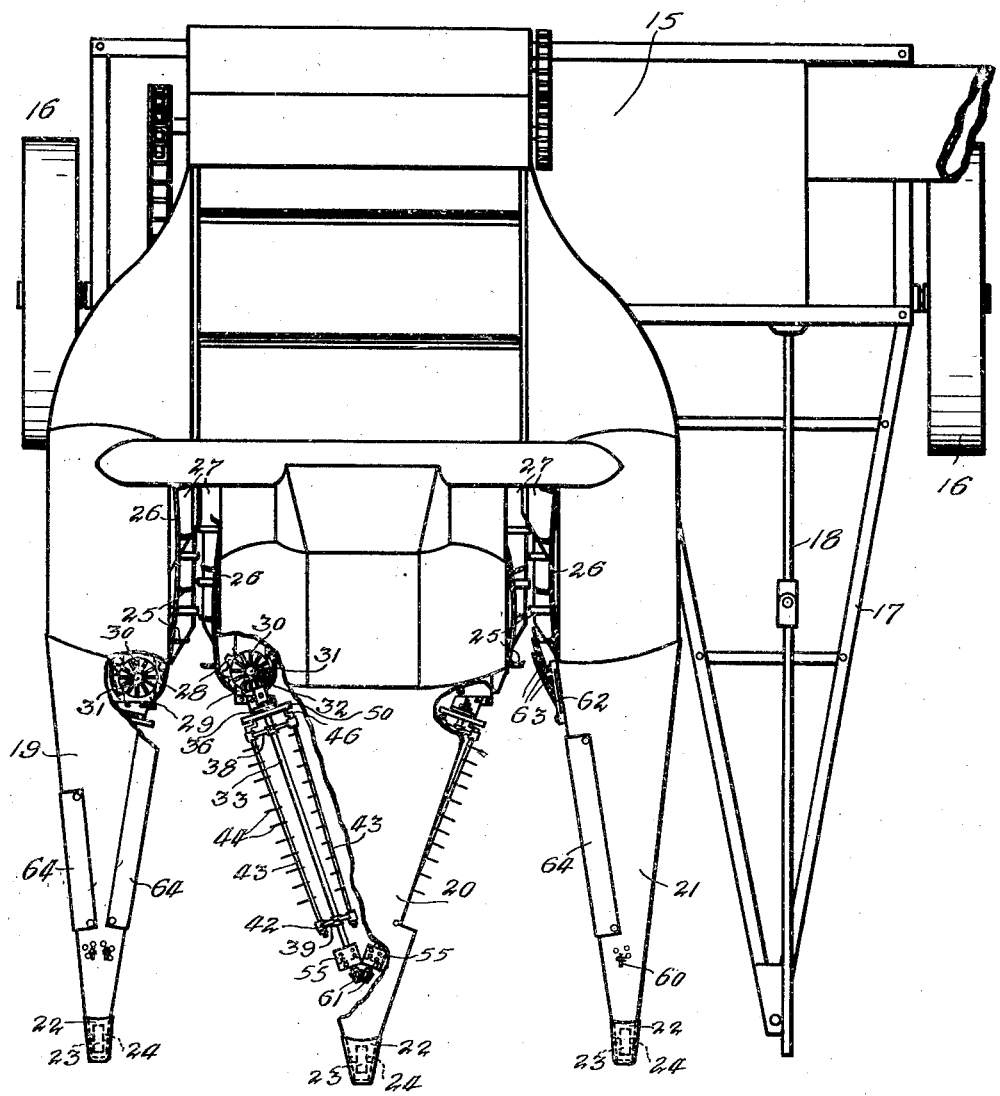

1,838,498

UNITED STATES PATENT OFFICE

AUGUST POSPISHIL, OF WESTPOINT, NEBRASKA

CORN HARVESTING MACHINE

Application filed December 26, 1930. Serial No. 504,919.

The present invention relates to corn harvesting machinery, and more particularly to certain attachments thereto for gathering the corn.

An object of the present invention is to provide an improvement in corn harvesting machinery which is in the way of certain attachments adapted to render more readily the gathering and harvesting of the corn, particularly when the stalks have fallen down and the ears of corn have become loosened.

Another object of the present invention is to provide an improved attachment for gathering the corn and which may be operated from the mechanism of the harvester machine so that no supplemental or additional operating mechanism is required.

A further object of the present invention is to provide a corn gathering mechanism for attachment to a harvesting machine which may be adjusted thereon so as to dispose the gathering device at the desired angle and also at the desired distance above the ground.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a top plan view of a corn harvesting machine equipped with the improvements of the present invention, certain parts being shown broken away.

Figure 2 is a detail enlarged side elevation of one of the corn gathering attachments.

Figure 3 is an inner face view of the trammel or guide plate at the end of the gathering device, the same being shown in section on the line 3—3 of Figure 2.

Figure 4 is a transverse section taken on the line 4—4 through the opposite ends of the gathering device.

Figure 5 is a detail top plan view of one of the outer end brackets of the gathering device.

Figure 6 is a detail fragmentary side elevation of one of the reel arms of the gathering device.

Figure 7 is a detail enlarged sectional view taken through one of the shafts of the reel, showing the mounting of one of the gathering fingers thereon.

Figure 8 is a detail side elevation of one of the pick up forks employed.

Figure 9 is a top plan view of the same.

Figure 10 is a detail enlarged section taken through one of the shields mounted on the points or outer ends of the forwardly projecting arms of the harvester.

Figure 11 is a detail perspective view of the hinge bracket for attaching the adjustable reel to the harvester; and Figure 12 is a fragmentary perspective view of one of the harvester arms, showing the reel adjustment holding means.

Referring now to the drawings, and first to Figure 1, there is shown somewhat diagrammatically a top plan view of a corn picker and harvester 15 having the usual supporting wheels 16 and which is provided at one side with the usual draft frame 17 and a power take-off shaft 18. The draft frame 17 is adapted for attachment to a tractor or the like for drawing the machine 15 over the ground and the power is transmitted from the tractor or the like through the shaft 18 to the mechanism of the corn picker or harvester 15.

Projecting forwardly from the other side portion of the machine 15 is a plurality of forwardly projecting arms 19, 20 and 21. There are preferably three of these forwardly projecting arms, and the arms taper substantially uniformly at opposite sides to points at their outer ends and are protected with caps or end pieces 22, shown in detail in Figure 10. The arms 19, 20 and 21 also taper downwardly at their upper sides and the caps 22 are hollow and are provided therein with rollers or wheels 23 adapted to engage the upper surface of the ground and support the caps and the forward ends of the arms 19, 20 and 21 in close proximity thereto.

Each cap 22 is provided with a transverse pin or shaft 24 upon which the adjacent wheel 23 is mounted as clearly shown in Figure 10. The central arm 20 is preferably of greater width at its inner or base end than is the width of the end arms 19 and 21, and the arms provide a pair of forwardly flaring throats adapted to align with the rows of corn stalks and into which the latter are adapted to engage during the forward movement of the machine.

The inner ends of the throats merge into substantially parallel walled slots in which operate corn feeding fingers 25 carried upon sprocket chains 26 and which co-operate with gripping rollers 27 adapted to engage the stalks and draw the same downwardly out of the slots or channels in the usual manner. The sprocket chains 26 are mounted in the harvesting machine in the usual manner and are supported at their forward ends upon sprocket wheels 28 mounted upon the forward ends of beams 29 by means of vertically disposed shafts 30.

The gathering device of the present invention embodies a means for driving the same which takes off the power from the vertical shaft 30, and for this purpose each shaft 30 is provided with a beveled gear 31 which faces upwardly and which intermeshes with a pinion 32 which is rounded at its crown, as shown in Figure 2, and which is mounted upon a reel shaft 33. The pinion 32 is provided with a hub or sleeve portion 34 which engages over the adjacent end of the reel shaft 33 and is fixed thereon by a set screw 35. The adjacent or inner end of the shaft 33 has bearing in a bracket plate 36 which is disposed adjacent to the sleeve or hub 34 and which at its lower end is provided with a hinged lug 37 suitably apertured for receiving bolts or the like to secure the lugs to the forward end of the adjacent beam 29. The lug 37 is so supported upon the beam 29 that the reel shaft 33 may be moved within certain limits into various relatively horizontal positions while the pinion 32 remains in intermeshing engagement with the beveled gear wheel 31.

The reel shaft 33 is provided with a pair of arms 38 and 39, one adjacent the end of the shaft 33 and with the arm 38 of greater length than the arm 39 so that the outer end of the reel is of smaller diameter than the inner end thereof. Each of these arms, 38 and 39, is provided at its intermediate portion with a hub 40 adapted to receive the adjacent portion of the shaft 33 therethrough and which is secured to the shaft in suitably adjusted position by a set screw 41. Each of the arms is provided upon its opposite ends with bearing portions 42 which are provided with openings therethrough suitably inclined so as to longitudinally align the bearing 42 of the opposite arms 38 and 39 in true axial alignment, as shown in Figure 2.

A pair of rocker shafts 43 is mounted in the bearing portions 42, one shaft 43 at the outer ends of the arms 38 at one side of the shaft 33 so that the shafts 43 converge outwardly with respect to the outer end of the reel. Each shaft 43 is provided with a plurality of gathering fingers 44 which are constructed of wire or other suitable material and which are threaded at their inner ends adapted to receive a pair of retaining nuts 45 thereon adapted for binding engagement against the opposite sides of the shaft 43, as shown in Figure 7.

The inner ends of the shafts 43 are each provided with an offset or crank portion 46 which provide shoulders for engagement against the bearing 42 of the arm 38 to hold the shaft 43 from longitudinal movement outwardly of the reel. The shafts 43, at their outer ends, are provided with washers 47 for engagement against the bearing portions 42 of the outer arm 39 and the washers are held in position by cotter pins 48 or the like.

The bracket plate 36 carries at its outer side a trammel plate which is made up of a central disc portion 49 and an outer ring portion 50 which is spaced concentrically about the disc 49 to provide a cam groove 51 therebetween. Straps 52 are secured against the rear faces of the disc 49 and ring 50 for holding the same together in the same plane.

From Figure 3 it will be noted that the cam groove or track 51 in the trammel plate is provided with an inwardly curved section 53. The extremity of the cranks 46 of the rocker shafts 43 engage in the track 51 during the rotation of the reel and, as the trammel plate is held in fixed position upon the bracket plate 36, the crank portions 46 are brought one at a time into the curved portion 53 of the guide groove to abruptly turn or rock the shafts 43 at that side of the reel.

The inwardly looped portion 53 of the track is located at the forward lower side of the trammel plate so that the gathering fingers 44 are brought forwardly against the ground and as they are raised they are abruptly swung into a raised position so as to throw backwardly and upwardly the ears of corn and the like which are caught on the gathering fingers 44.

The outer end of the reel is adjustably supported upon a bearing plate 54 provided at its upper end with an attaching flange 55 adapted to be riveted or otherwise suitably secured against the underside of the shell of the adjacent finger, such as the finger 20. The bearing plate extends downwardly from the flange 55 and is provided in its outer edge with a series of horizontal slots 56 terminating at their inner ends in downwardly offset bearing openings for selectively receiving therein the outer end of the reel shaft 33.

The reel shaft 33 is held in its selected slot 56 by means of a vertically movable rod 57 which is disposed in vertically aligned openings in the bearing plate 54 as shown at 58 in Figure 5. The upper end of the rod 57 is overturned to provide a finger 59 which is adapted to seat against the upper outer face of the finger 20 and which is adapted to be swung, by the turning of the rod 57, into engagement beneath a spring clip 60 carried on the upper side of the adjacent finger. The clip 60 is adapted to hold the rod 57 in closed position.

As shown in Figures 1, 4 and 5, the bearing plate 54 may be made in double with the plates disposed at a suitable angle to one another so as to support the outer ends of an adjacent pair of the reels when they are mounted upon one of the arms, such as the intermediate arm 20. In this instance, the outer ends of the reel shafts 33 are provided with intermeshing pinions 61, adapted to intercommunicate motion between the reels so that but one of the reels need be driven, as shown in Figure 1, and the rear end of the second reel does not carry a rounded pinion 32.

Another feature of the present invention is to provide pick up forks at the inner ends of the throats between the arms 19, 20 and 21. These forks are of the construction shown in Figures 8 and 9, and each fork comprises a bar 62 which carries a row of flexible tines 63 which are curved outwardly and upwardly, and which at the same time extend rearwardly with respect to the machine. The bar 62 is riveted or otherwise suitably secured to the side of the arm or finger near the inner end of the throat so that the free ends of the tines 63 project into the forward ends of the slots or channels which lead into the harvesting machine.

The fingers or arms 19, 20 and 21 are provided with detachable closure plates 64 adapted to be riveted or otherwise suitably secured to the sides of the arms when the reels are removed therefrom so as to engage and support the corn stalks as they slide into the throats of the machine, and the plates are adapted to be used when the reels are not to be employed. The reels of course are detachable by merely removing the bracket plates 36 and disengaging the forward ends of the reel shafts 33 from the bearing plates 54.

In operation, the machine is moved forwardly in the usual manner and the throats of the machine are arranged substantially in alignment with two adjacent rows of corn. The corn stalks are slidably connected with the opposite sides of the arms or fingers 19, 20 and 21 and the wheels are driven by the mechanism of the machine as above described so as to bring the gathering fingers 44 into proper position and in close proximity to the ground so as to engage any fallen stalks or loose ears and to raise the same into the path of the slots or channels so that the fingers 25 may engage them and carry the ears of corn into the machine.

The reels may be adjusted upon the adjusted plates 54 so that the outer ends of the reels are disposed at the desired height with respect to the ground surface and consequently the machine by careful adjustment may be made to very effectively and efficiently catch all of the loose ears and fallen stalks, and to thus obviate the necessity of following the machine over the field to gather up the usual large quantity of detached ears and fallen stalks which the machine usually misses.

It is obvious that various changes and modifications may be made in the details of construction and design of the above specifically described embodiment of this invention without departing from the spirit thereof, such changes and modifications being restricted only by the scope of the following claims.

What is claimed is:—

1. A corn gathering mechanism for attachment to corn harvesters having a forwardly projecting arm, comprising a reel, means for mounting the reel at the side of the forwardly projecting arm of the harvester, operating means for the reel for attachment to the mechanism of the harvester, said reel having gathering fingers, and means connected to the reel and operable upon the rotation thereof for swinging said fingers upwardly with an accelerated motion as they approach the exposed side of said arm.

2. A corn gathering device for corn harvesters having a forwardly projecting arm, comprising a reel, means for mounting the reel at the side of the forwardly projecting arm of the harvester, operating means for the reel for connection with the mechanism of the harvester, rocker shafts carried by the reel and having crank portions at their inner ends, a fixed trammel plate at the inner end of the reel having a trackway adapted to receive the crank portions of the rocker shafts, rows of gathering fingers mounted on the rock shafts, said cam track having an inwardly looped portion at its forward lower side adapted to successively actuate the rocker shafts to swing the gathering fingers upwardly with an accelerated motion as the latter move toward the side of the arm.

3. A corn gathering reel for connection to a corn harvester, comprising a bracket plate adapted for attachment to the harvester, a reel shaft journalled at one end through the plate, driving means carried by the shaft for engagement with the mechanism of the harvester, arms mounted upon the opposite ends of the shaft, rocker shafts journalled in the outer ends of said arms and provided with crank portions at their inner ends, a trammel plate mounted on said bracket and having a trackway for receiving the crank portions of the rocker shafts, and a bearing plate adapted to be mounted on the harvester adjacent said opposite end of the reel shaft and provided with a series of bearing slots adapted to selectively receive therein the adjacent end of the reel shaft for supporting the latter at various heights from the surface of the ground.

4. A corn gathering attachment for corn harvesters having a throat, comprising a reel having gathering fingers, means for mounting the reel in one side of the throat of the harvester, operating means for the reel adapted for attachment with the mechanism of the harvester, and pick up forks adapted to be mounted at the side of the throat of the harvester rearwardly of the reel.

5. A corn gathering attachment for corn harvesters having a throat, comprising a reel, means for mounting the reel at the side of the throat of the harvester, operating means for the reel adapted for attachment to the mechanism of the harvester, said reel having movable gathering fingers adapted to be brought consecutively to the side of the throat adjacent the ground, and means connected to the reel and to said gathering fingers for swinging the latter upwardly with an accelerated motion as the fingers are brought to the side of the throat of the harvester.

6. A corn gathering attachment for harvesters having a throat, comprising a reel, means for securing the reel at the side of the throat of the harvester, rocker shafts on the reel, gathering fingers carried by the rocker shafts, rocking means for the shafts carried by the reel and operable on the shafts as the latter approach the side of the throat of the harvester, turning means for the reel adapted for connection with the mechanism of the harvester, and a pick up fork adapted to be mounted in the throat of the harvester rearwardly of the wheel.

7. A gathering attachment for corn harvesters having a throat, comprising a reel, rocker shafts carried by the reel and having crank portions at one end, rows of gathering fingers mounted on the rock shafts, turning means for the reel adapted for connection with the mechanism of the harvester for operating the reel, a trammel plate mounted on the harvester near said crank portions of the rocker shafts and having a trackway for receiving said crank portions therein, said trackway having an inwardly looped portion at one side adapted to swing the rock shafts and raise said fingers as the latter are brought to the side of the throat of the harvester, a pick up fork, and means for securing the pick up fork in the throat of the harvester to receive fallen stalks and ears of corn from the gathering fingers.

8. Corn gathering mechanism for attachment to harvesters having a forwardly projecting arm, comprising a pair of reels, means for mounting the reels at the opposite sides of a forwardly projecting arm on the harvester, interconnecting means for the reels at the forward ends thereof, operating means on one reel adapted for connection with the mechanism of the harvester to drive both reels, rocker shafts on the reels, gathering fingers on the rocker shafts, means engaging the rock shafts for swinging the same and moving the gathering fingers upwardly at the opposite sides of the arm to catch and raise fallen stalks and ears from the ground, and pick up forks adapted to be mounted on the opposite sides of the arm rearwardly of the reels to receive the stalks and ears therefrom.

9. In combination with a corn harvester, a plurality of forwardly tapering and projecting arms, rollers mounted in the tips of the arms to support the same in closely spaced relation above the surface of the ground, a plurality of reels mounted in the opposite sides of said arms, adjustable means supporting the forward ends of the reels for disposing the same at the desired elevation with respect to the ground surface beneath the arms, driving means for the rollers for connection with the mechanism of the harvester, gathering fingers carried by the reels, independent means for the reels for swinging said gathering fingers upwardly as the latter leave the ground at opposite sides of the arms, and pick up forks carried upon the inner ends of the arms rearwardly of the reels to receive fallen stalks and ears of corn from the gathering fingers.

10. A gathering reel for attachment to corn harvesters, comprising a bracket plate, a trammel plate carried by the bracket plate and having an open trackway therein, a shaft journalled at one end in the bracket and trammel plates, an operating pinion on said end of the shaft and having a rounded crown face for admitting adjustment of the shaft, a pair of arms mounted in spaced apart relation on the shaft and with one arm of greater length than the other arm, a pair of rocker shafts journalled in the ends of said arms, gathering fingers mounted on the rocker shafts, said rocker shafts having crank portions at their ends engaging in the cam trackway of the trammel plate and said trackway having an inwardly looped portion at one side for abruptly swinging the rocker shafts at said side of the reel during the turning thereof, a vertically disposed bearing plate having a series of horizontal bearing slots therein adapted to selectively receive the outer end of said reel shaft for adjustably supporting the other end of the reel at the desired height, a removable rod carried in the bearing plate and engaging across the ends of said slots for holding the reel shaft in the selected slot, and means for yieldingly holding the rod in position.

In testimony whereof, I have affixed my signature.

AUGUST POSPISHIL.